United States Patent [19]

Schick

[11] 4,060,877
[45] Dec. 6, 1977

[54] FASTENER FOR CONVEYOR BELTS OR BANDS
[75] Inventor: Jean-François Schick, Paris, France
[73] Assignee: Societe Goro, Chelles, France
[21] Appl. No.: 771,254
[22] Filed: Feb. 23, 1977
[30] Foreign Application Priority Data
Feb. 27, 1976 France .................................. 76.05482
[51] Int. Cl.² ............................................. F16G 3/02
[52] U.S. Cl. ................................................. 24/33 B
[58] Field of Search ................... 24/31 H, 33 R, 33 F, 24/33 P, 33 B

[56] References Cited
U.S. PATENT DOCUMENTS 3,327,358  6/1967  Schick .................................. 24/33 B
3,742,557  7/1973  Francois .............................. 24/33 B
3,962,754  6/1976  Stolz .................................... 24/33 B Primary Examiner—G. V. Larkin
Attorney, Agent, or Firm—Michael J. Striker

[57] ABSTRACT

The belt-fastener is cut from sheet metal strip of substantially constant width and the U-shaped elbowed portion of the fastener which forms a hinge-knuckle is folded in two in the transverse direction. The two folded sides are applied against each other in a plane located at right angles to the general plane of the clamping tongues of the fastener and form a progressive junction with the edge of each tongue. The hinge-knuckles are thus endowed with enhanced mechanical strength and provided on each side with a free space for positioning the hinge-knuckles of the opposite row.

4 Claims, 12 Drawing Figures

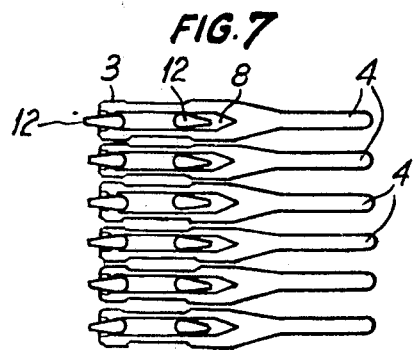
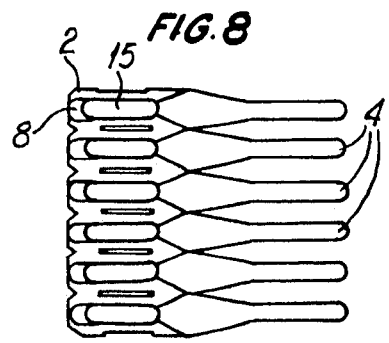
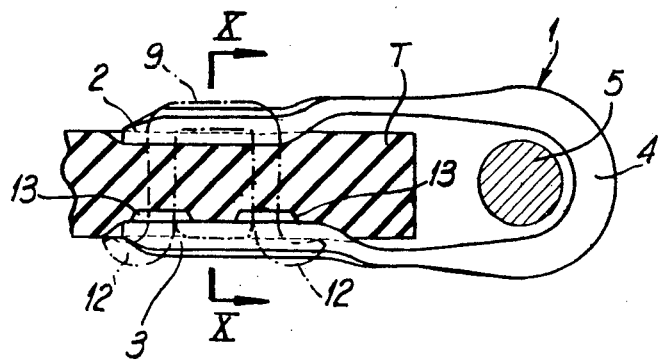
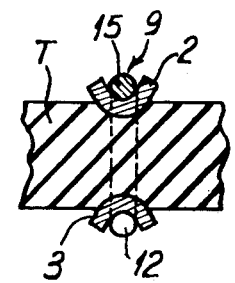
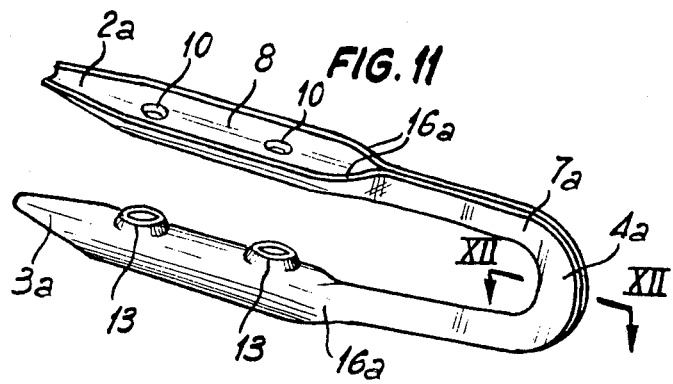
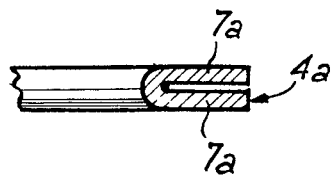

FASTENER FOR CONVEYOR BELTS OR BANDS

This invention relates to joint fasteners which are employed for coupling the ends of conveyor belts or bands and drive belts.

In more exact terms, the invention relates to fasteners of the type consisting of a metallic element cut from steel strip and bent in the shape of a U in order to be mounted astride and on the edge of one of the two belt ends to be joined together. The two superposed arms of an element of this type form clamping tongues for the purpose of fastening the element on the corresponding belt end, this fastening operation being performed by means of rivets or staples which join said clamping tongues together as a result of insertion through the end of the corresponding belt or band.

The elbowed portions of the above-mentioned elements are placed in an outwardly projecting position with respect to the edge of the end portion of the belt and form a corresponding number of hinge-knuckles which are intended to interengage with the hinge-knuckles of similar fasteners fitted on the other end of the belt, these two series of knuckles being coupled together by means of a hinge-pin which is passed through these latter.

Belt-fasteners of this type which are in use at the present time are usually manufactured by cutting-out and die-stamping. In order to permit interengagement of the series of hinge-knuckles of two complementary rows of fasteners, it is necessary to ensure that the width of the knuckles is smaller than that of the clamping tongues. With this object in mind, the steel strip which is at present employed in the manufacture of these fasteners is therefore provided with cut-out portions at the points corresponding to the hinge-knuckles. This accordingly has the effect, however, of reducing the mechanical strength of the belt-fasteners at the very point at which they are subjected to high stresses. It may be noted in addition that, at this point, the hinge-knuckles are also subject to wear by reason of the rubbing friction with which they are applied against the hinge-pin, this hinge-pin being usually made of metal having very high strength.

In order to overcome the major disadvantage which thus arises from reduction in mechanical strength of belt-fasteners of this type at the hinge-pin locations, it has been proposed to form these latter from steel strip which has a special profile and an appreciably larger cross-sectional area at the point of formation of the hinge-knuckles. This results, however, in a considerable increase in capital expenditure since it proves necessary to form a steel strip which has a variable thickness and a very special profile.

For this reason, the aim of the present invention is to produce a belt-fastener of the type under consideration in which the hinge-knuckle has enhanced mechanical strength without thereby entailing the use of steel strip having a special profile.

To this end, the belt-fastener aforesaid is fabricated from steel strip of substantially constant width and the elbowed portion which is intended to serve as a hinge-knuckle is folded in two in the transverse direction, the two sides of the fold thus formed being applied against each other in a plane which is substantially perpendicular to the general plane of the two clamping tongues.

The result thereby achieved is to ensure substantially enhanced mechanical strength of the hinge-knuckle while making provision on each side of this latter for the free space which is necessary in order to position the hinge-knuckles of the fasteners of the opposite row. However, the two sides of the fold which is formed at the point corresponding to each hinge-knuckle form a progressive junction with each edge of the clamping tongues without any cut-out portion or notch which would be liable to impair the mechanical strength of the fastener.

In a particular form of construction of the belt-fastener under consideration, the sides of the elbowed portion corresponding to each hinge-knuckle are folded-back against each other towards the interior of the corresponding elbowed portion. However, in another form of construction of said fastener, the folded-back sides of the knuckle are oriented in the opposite direction.

In either case, the edges of the two clamping tongues are advantageously raised in order to form a virtual trough which extends in the longitudinal direction and the concave portion of which is directed outwards. The channel thus formed can therefore serve as a housing for the corresponding end of a clamping staple which is preferably formed of wire. The points of said staple are engaged through holes formed in register in the two clamping tongues of each belt-fastener. The central portion of the staple aforesaid is intended to fit within the channel of one of said clamping tongues whilst the points of the staple are bent-back within the channel of the opposite tongue.

Further properties and advantages of the joint fastener under consideration will become apparent from the following description, reference being made to the accompanying drawings which are given solely by way of indication, and in which:

FIGS. 7 and 8 are plan views of both faces of a joint fastener constituted by a series of fasteners in accordance with the invention and placed in succession;

FIG. 9 is a view in sectional elevation showing the method adopted for positioning and fixing a fastener in accordance with the invention on the end of a conveyor belt;

FIG. 10 is a fragmentary sectional view taken along line X—X of FIG. 9;

FIG. 11 is a view in perspective showing another form of construction of a joint fastener in accordance with the invention;

FIG. 12 is a fragmentary sectional view taken along line XII—XII of FIG. 11.

The joint fastener 1 shown in FIGS. 1 to 5 has the general shape of a U in the same manner as the usual fasteners of this type. The fastener is intended to be fixed on the edge of the conveyor-belt T in such a manner as to be mounted astride this latter as shown in FIG. 9. Said fastener therefore has two superposed arms 2 and 3 which are intended to serve as clamping tongues applied against the end of the conveyor-belt T. So far as the elbowed portion 4 of the fastener is concerned, said portion is intended to constitute a hinge-knuckle which is capable of interengaging with the hinge-knuckles of similar fasteners fixed on the other end of the belt T, these different hinge-knuckles being coupled together by means of a connecting hinge-pin 5 which is passed through these latter.

Figure 6:
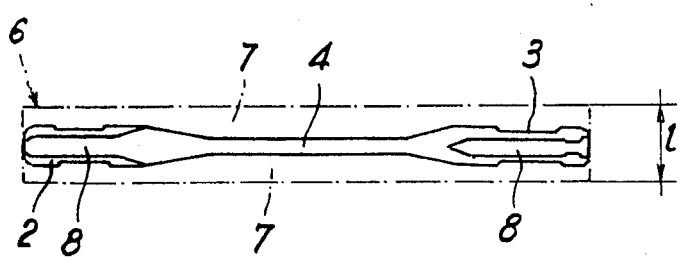
FIG. 6 is an overhead plan view of the sheet metal strip from which a fastener of this type is formed.

In accordance with the essential feature of the invention, the belt-fastener under consideration is fabricated from a sheet metal strip 6 having a width l which is practically constant over its entire length (see FIG. 6). However, the portion 4 which is intended to serve as a hinge-knuckle is folded in two in the transverse direction, the two sides 7 of the fold thus formed being applied against each other in a plane which is substantially perpendicular to the general planes of the two clamping tongues 2 and 3. In addition, said plane is perpendicular to the theoretical axis of the elbowed portion of the hinge-knuckle 4 and of the hinge-pin 5 when this latter is in position.

As can be observed from FIGS. 1 to 5, the sides 7 of the hinge-knuckle 4 are folded-back towards the interior of this latter. Thus the elbowed portion of this fold is directed outwards.

In accordance with another important feature, the clamping tongues 2 and 3 are each cambered in the form of a trough 8 which extends in the longitudinal direction and the concavity of which is directed outwards. The width e of the channel formed by each of these troughs is such that this latter can serve as a housing for the corresponding end of the wire staple 9 employed for fixing the belt-fastener in position.

In addition, two holes 10 are formed in the bottom of the channel of the tongue 2 and two further holes 11 are formed in register in the tongue 3. These holes are intended to permit insertion of the two arms of the corresponding clamping staple 9.

Figure 1:
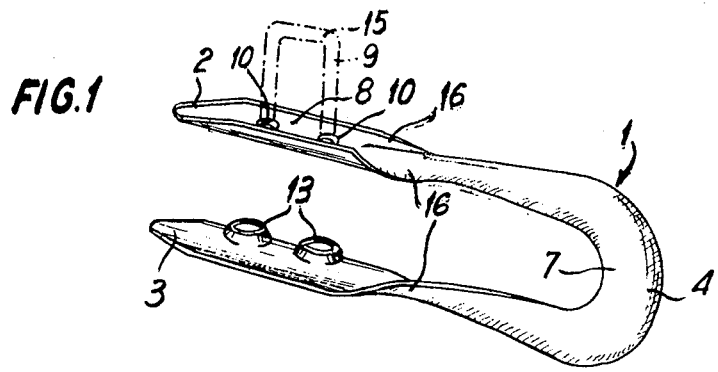
FIG. 1 is a view in perspective showing a joint fastener in accordance with the invention.
Figure 2:
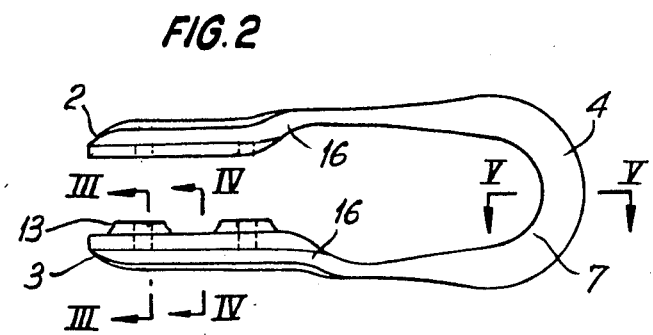
FIG. 2 is a view in side elevation showing a fastener of this type.

At the time of positioning, said staple is presented as illustrated in FIG. 1. The points of the two arms aforesaid are therefore engaged in the holes 10 of the clamping tongue 2. Said staple is then forcibly inserted through the end of the belt T in such a manner as to ensure that the arms of said staple pass through said belt from one side to the other and that the points 12 of the staple accordingly engage through the holes 11 of the clamping tongue 3, said points being then bent-back within the external channel 8 of this latter as shown in FIG. 9. This operation involving insertion of the staple and bending-back of the points 12 of this latter is advantageously carried out by means of a suitable apparatus designed for this purpose.

Figures 3, 4, 5:
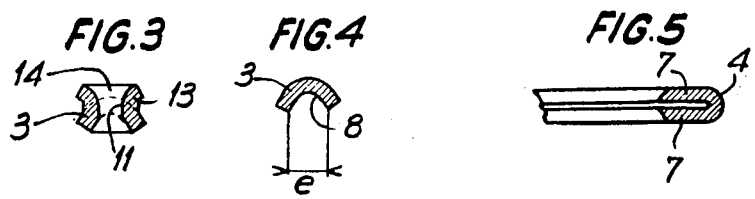
FIGS. 3, 4 and 5 are fragmentary sectional views taken respectively along lines III—III, IV—IV and V—V of FIG. 2.

In order to facilitate the engagement of the points 12 of the staple 9 in the holes 11 of the clamping tongue 3, provision is advantageously made at the level of each hole for a small collar 13 which projects from the internal face of said tongue and has a flared end portion 14 (as shown in FIG. 3). This flared-out portion accordingly facilitates the engagement of the corresponding point 12 of the staple while ensuring in particular that this latter is correctly centered if said point is not located exactly opposite the hole 11 after having passed through the belt T.

It is readily apparent that, after they have been bent back, the points 12 of the staple 9 are housed at least to a partial extent within the external channel of the clamping tongue 3 as shown in FIGS. 9 and 10. In regard to the central portion 15 of the staple 9, said portion is in turn housed within the channel 8 of the clamping tongue 2. Thus the ends of the clamping staple 9 project only to a very slight extent with respect to each clamping tongue 2 and 3 of the belt-fastener in accordance with the invention.

It is worthy of note in this connection that the above-mentioned clamping tongues are in turn partially embedded in each face of the belt T as shown in FIGS. 9 and 10. Moreover, this partial penetration is greatly facilitated by the special cambered shape of the clamping tongues 2 and 3 and has the further effect of reducing the projection formed by said tongues with respect to each face of the conveyor belt T. This is particularly advantageous when the fastener passes over the belt-wipers of the installation as well as over the driving roller and idler roller.

However, the main advantage of the joint fastener in accordance with the invention lies in the mechanical reinforcement of its hinge-knuckle 4 as obtained by folding-back the sides 7 of this latter. This mode of construction has the advantage not only of ensuring substantial mechanical strengthening of the hinge-knuckle but also of freeing on each side of said knuckle the necessary space for positioning the knuckles of the opposite row of fasteners.

It should again be recalled that the belt-fastener in accordance with the invention is constituted by a metallic strip which does not entail the need for any removal of metal across the width of this latter. In fact, the different parts of the strip simply have portions which are either bent or cambered in each direction. It may be noted in this connection that the folded-back sides 7 of the hinge-knuckles form a progressive junction with the cambered edges of the tongues 2 and 3 which are raised in the opposite direction, this junction being formed by connecting portions 16, each of which is in turn formed by means of a twisted edge. Thus there does not exist any cut-out portion or notch which would be liable to constitute points of lower mechanical strength.

A series of belt-fasteners in accordance with the invention can be manufactured in continuous sequence from a sheet metal strip having a width l which is subsequently cut into elements such as the element 6 shown in FIG. 6. This element then undergoes a series of successive work passes for carrying out on the one hand the general folding of said element in two in the longitudinal direction and, on the other hand, the folding of the hinge-knuckle in two in the transverse direction as well as the cambering of the clamping tongues 2 and 3.

It is then possible to assemble a series of elements of this type in juxtaposed relation so as to form a row of fasteners constituting one of the two components of a hinge-type joint fastener.

However, it is also possible to manufacture a series of fasteners of this type which are placed side by side as shown in FIGS. 7 and 8 and attached to each other by means of junction points.

This manufacturing operation is accordingly carried out by making use of a sheet metal strip which is first sheared so as to form a series of transverse lines which delimit the different fasteners to be formed. Said sheet metal strip is then re-flattened with the press and then undergoes the different successive operations of shaping of the various portions of each fastener.

FIGS. 11 and 12 illustrate another form of construction of the joint fastener in accordance with the invention. This fastener differs from the previous embodiment solely in the fact that the orientation of the folded-back portions 7a of the hinge-knuckle 4a is reversed. In fact, the metal strip which constitutes said hinge-knuckle is folded in two in the outward direction. The fold thus formed is therefore placed on the inside of the knuckle and no longer on the outside as in the previous embodiment. In this case, said fold therefore comes into contact with the hinge-pin 5 at the time of utilization of the fastener under consideration.

However, the two clamping tongues 2a and 3a of the belt-fastener are cambered in the same manner as the tongues 2 and 3 of the fastener which is illustrated in FIGS. 1 to 5. Both tongues therefore have an external groove 8 which extends in the longitudinal direction and in the bottom of which are formed of holes 10 or 11 for the insertion of the arms of the clamping staple.

As will be readily understood, the folded-back sides 7a of the hinge-knuckle 4a are joined to the raised edges of the two tongues 2a and 3a by means of suitably cambered junction portions 16a. It should be noted in the present instance, however, that the orientation of the folded-back sides 7a of the hinge-knuckle 4a is the same as the orientation of the raised edges of the clamping tongues 2a and 3a.

However, it is also possible to provide other alternative forms in which the incurvation of the arms of at least one of the fasteners could be reversed. It is thus possible to provide an alternative design in which the arm located on the same side as the head 15 of the clamping staple 9 has an outwardly directed convexity. This makes it possible to place said arm above the head of the staple which can be rigidly fixed thereto by means of spot welds. But once again, other alternative forms can be contemplated.

As already stated, the joint-fastener under consideration is primarily intended to be employed for joining the ends of conveyor belts or bands. However, the fastener can be employed for joining any other elements of a similar type.

If so required, a clamping staple 9 can be fixed beforehand on one of the clamping tongues of the fasteners in accordance with the invention, the points of said staple being inserted in the holes 10 of the clamping tongue 2. It is then only necessary to insert said staples after the fasteners have been placed in position on the edge of the end portion of a conveyor belt or the like.

I claim:

1. A belt-fastener of the type consisting of a metallic element bent in a U-shaped elbow and comprising two superposed arms forming clamping tongues for fastening said element on said belt and an elbowed portion constituting a hinge-knuckle adapted to receive a hinge-pin, wherein said belt-fastener is manufactured from sheet metal strip of substantially constant width and the elbowed portion is folded in two in the transverse direction, the two sides of the fold thus formed being applied against each other in a plane located substantially at right angles to the general plane of the two clamping tongues and thus ensuring a substantial increase in the mechanical strength of the hinge-knuckle while freeing the space required for the engagement of the hinge-knuckles of the fasteners which are placed on the other end of the belt or band, the two sides thus folded-back being progressively joined to each edge of said clamping tongues.

2. A belt-fastener as defined in claim 1, wherein the two sides of the transverse fold of the hinge-knuckle are folded-back inwards, said fold being thus located on the external face of said hinge-knuckle.

3. A belt-fastener as defined in claim 1, wherein the two sides on the transverse fold of the hinge-knuckle are folded-back outwards, said fold being thus located on the internal face of said hinge-knuckle.

4. A belt-fastener as defined in claim 1 in which the edges of each clamping tongue are raised in the outward direction so as to form a channel which extends in the longitudinal direction and is capable of serving as a housing for a clamping staple whose arms are inserted through holes formed in the clamping tongues, projecting collars being formed on the internal face of one of the clamping tongues around the holes provided for the insertion of the arms a clamping staple, wherein said collars have a flared end portion.

* * * * *